July 15, 1969    H. L. COTTRELL    3,455,110
VARIABLE HYDRAULIC TRANSMISSION AND CONTROL
Filed March 29, 1967
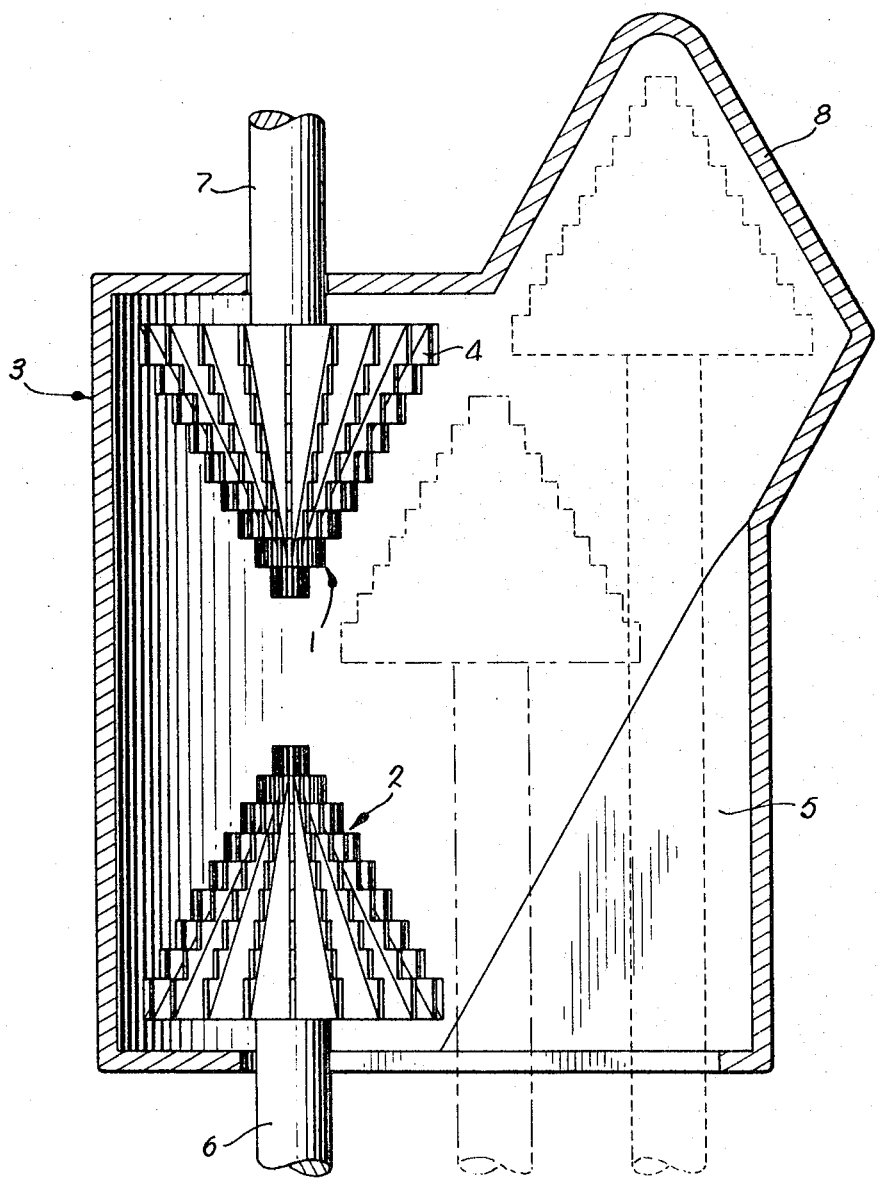
INVENTOR
Harold L. Cottrell
BY Schmidt, Johnson, Hovey,
Williams & Bradley
ATTORNEYS.

United States Patent Office 3,455,110
Patented July 15, 1969

3,455,110
**VARIABLE HYDRAULIC TRANSMISSION
AND CONTROL**
Harold L. Cottrell, Kansas City, Mo.
(12411 Valley Brook Drive, Grandview, Mo. 64030)
Filed Mar. 29, 1967, Ser. No. 628,228
Int. Cl. F16d 33/04; F16h 41/00
U.S. Cl. 60—54                               3 Claims

ABSTRACT OF THE DISCLOSURE

A power transmission unit including, within a sealed, fluid filled container, a driving impeller coupled with a suitable power source outside the container and a driven turbine within the container and suitably coupled with a power output shaft, the turbine being shiftable relative to the impeller. The impeller and the turbine are of similar, conical configuration and each is provided with a plurality of vanes whereby power supplied to the driving impeller may be transferred through the fluid in varying, predetermined amounts, to the driven turbine and thereby to the power output shaft.

---

The present invention relates to the hydraulic transmission of power from a power source, such as an engine shaft, to a power output shaft in such a manner that the speed and power of the output shaft may be varied.

Precisely, this invention is distinguished from prior hydraulic transmissions by the use of vanes mounted on the sides of the conical impeller and conical turbine instead of utilizing disc or windmill type impellers. Further, the transmission unit provides integral control and flexibility in choices of power and speed transmitted to the power output shaft.

The movement of the driven turbine in an oblique, longitudinal direction relative to the impeller determines the amount of energy available for delivery to the power output shaft. This is advantageous as compared with prior art devices which do not provide a turbine which is shiftable in an oblique, longitudinal direction with respect to the impeller.

This construction allows smooth transmission of power from the impeller to the turbine by easy positioning of one relative to the other in a virtually unlimited number of positions from a neutral position to a fully driven position.

Former devices for hydraulic transmission of power normally have supplemental gearing devices for accomplishing the different power and speed settings and do not allow an infinite number of selections by the operator, driver or controller as to how much power and speed is to be obtained in combination with the load or speed requirement. In the present device, the shiftable turbine permits positive selection of any number of speed power combinations.

It is, therefore, the primary object of this invention to provide a power transmission unit having an impeller and a turbine, each conical in configuration, and having a plurality of longitudinally extending vanes thereon whereby power delivered to the impeller is transferred through a fluid medium to cause rotation of the turbine.

The impeller and the turbine are both positioned within a sealed fluid-filled container, the impeller being coupled with a suitable power source outside the container and the turbine being coupled with a power output shaft extending from the turbine exteriorly of the container.

Another important aim of this invention is the provision, on the impeller and the turbine, of a plurality of radially disposed vanes, in the nature of a plurality of strips extending from the toe to heel of the conical impeller and turbine, the vanes being in strip form and having a serrated peripheral edge.

Still another object of the invention is to provide an easy translation from low speed and power to optimum power and high speed with no waste of time and motion or sudden uncontrolled surges of power.

Other objects and many of the attendant advantages of this invention will be readily appreciated as the same become better understood from the following specification and accompanying drawing, wherein The single figure is a top plan view of the variable hydraulic transmission and control unit, parts being in cross section to reveal details of construction.

Referring now to the drawing, it will be seen that there is an impeller 1 and a turbine 2. Impeller 1 rotates and remains at a given point within the container. Turbine 2 has the same conical angle as the impeller 1 but may be larger or smaller according to the manufacturer's desire. Turbine 2 is slidable laterally and obliquely longitudinally toward the impeller 1 but does not ever come within physical contact with the impeller 1. The movement of turbine 2 relative to impeller 1 is in an oblique direction substantially parallel to the surface angle of the conical impeller 1. Other possible angles of movement could be utilized, but the relative movement of the turbine with respect to the impeller would have to be compatible to the extent that the turbine would not touch the impeller.

Vanes 4 mounted integrally on or made a part of the conical impeller 1 and the turbine 2 are illustrated in the drawing in a typical form which may be utilized, vanes 4 sometimes being termed spades or burrs. Vanes 4 may be designed in a more shallow, deep or curved configuration or designed for more jet efficiency in manners not shown in the drawing. The configuration of the vanes 4 would be varied according to the density of the fluid or other factors. Each vane 4 on the impeller 1 and the turbine 2 acts as continued jet power thrusters and receivers within the sealed fluid containers 3.

It will be seen that by selectively placing turbine 2 in any position ranging form its full line position as shown in the drawing through and including the various dashed line positions shown in the drawing, that variable speed power combinations obtainable include one of the no-power, no-speed when the turbine 2 is in axial alignment with the impeller 1, that is in its full-line position in the drawing. Surging of the fluid with which the container 3 is filled may cause minute oscillation of turbine 2 toward its dashed-line positions, depending upon the inner design of the container.

Container 3 is shown only in its simplest form and includes a finned section 5 which contains the fluid medium and allows the output shaft 6 which is coupled with turbine 2 to be moved laterally from its initial positions as the turbine 2 is moved laterally, obliquely and longitudinally with respect to impeller 1. A telescopically, movably mounted shield with accompanying seal would be provided for shaft 6, the same not being shown, the shield and seal permitting lateral movement of said shaft 6. The rotary shaft 7 of impeller 1 remains in a fixed position, the same being driven by a suitable power source (not shown). The container 3 is configured in such a manner as to allow an area 8 for the turbine 2 to move to an extended position within said area 8.

Several types of actuators can be used to position turbine 2 relative to impeller 1 and to move the same through its oblique path of travel, such means being possibly of a hydraulic electronic or magnetic force. The shaft 6 would be coupled with the device to be ultimately driven by suitable joint connections with shaft 6 on the outside of the container 3.

What is claimed is:

1. In a hydraulic transmission:
a container adapted to be filled with fluid;
a pair of shafts rotatably mounted in said container and extending therefrom in initial axial alignment,
a conical impeller mounted in said container on one of said shafts; and
a conical turbine mounted in said container on the other shaft,
said other shaft being shiftable in an oblique direction with respect to said one shaft from the initial position of said other shaft in substantial axial alignment with the one shaft to a position substantially parallel to the latter.

2. The invention of claim 1:
there being a plurality of vanes projecting outwardly from the surface of the conical impeller and a plurality of vanes projecting outwardly from the surface of the conical turbine.

3. The invention of claim 2:
each of said vanes being in the form of a strip extending from the toe of its corresponding cone to the heel thereof and having a serrated edge projecting radially from said cone.

References Cited
UNITED STATES PATENTS

| | | | |
|---|---|---|---|
| 2,395,047 | 2/1946 | Hanson | 60—54 |
| 2,536,564 | 1/1951 | Novak | 60—54 |
| 2,553,380 | 5/1951 | Putt | 60—54 |
| 3,091,430 | 5/1963 | Thomas | 60—54 XR |

JULIUS E. WEST, Primary Examiner

U.S. Cl. X.R.

192—58